(12) United States Patent
Lim

(10) Patent No.: US 11,226,024 B2
(45) Date of Patent: Jan. 18, 2022

(54) PLANETARY GEAR REDUCTION DEVICE FOR SUPER HIGH SPEED REDUCTION

(71) Applicant: SEJIN-IGB CO., LTD., Asan-si (KR)

(72) Inventor: Sun Ho Lim, Asan-si (KR)

(73) Assignee: SEJIN-IGB CO., LTD., Asan-si (KR)

( * ) Notice: Subject to any disclaimer, the term of this patent is extended or adjusted under 35 U.S.C. 154(b) by 476 days.

(21) Appl. No.: 16/328,343

(22) PCT Filed: Jul. 21, 2017

(86) PCT No.: PCT/KR2017/007863
§ 371 (c)(1),
(2) Date: Feb. 26, 2019

(87) PCT Pub. No.: WO2018/043914
PCT Pub. Date: Mar. 8, 2018

(65) Prior Publication Data
US 2021/0285520 A1    Sep. 16, 2021

(30) Foreign Application Priority Data

Sep. 1, 2016  (KR) .......................... 10-2016-0112494

(51) Int. Cl.
*F16H 45/02*    (2006.01)
*F16H 1/32*     (2006.01)
(Continued)

(52) U.S. Cl.
CPC ................ *F16H 1/32* (2013.01); *F16H 1/46* (2013.01); *F16H 57/02* (2013.01);
(Continued)

(58) Field of Classification Search
CPC ... F16H 1/32; F16H 57/02; F16H 1/46; F16H 2057/02034; F16H 2001/323; F16H 2057/02073; H02K 7/116
(Continued)

(56) References Cited

U.S. PATENT DOCUMENTS 4,348,918 A * 9/1982 Fukui ....................... F16H 1/32
                                                   475/179
6,761,660 B2 * 7/2004 Lim ......................... F16H 1/32
                                                   475/179
(Continued)

FOREIGN PATENT DOCUMENTS

CN   1836104 A    9/2006
DE   102009028411 A1   2/2011
(Continued)

OTHER PUBLICATIONS

Office Action dated Feb. 25, 2020 from Japanese Patent Application No. 2019-512242 to Sejin-igb Co., Ltd.
(Continued)

*Primary Examiner* — Charles A Fox
*Assistant Examiner* — Farhana Pervin
(74) *Attorney, Agent, or Firm* — Vorys, Sater, Seymour and Pease LLP

(57) ABSTRACT

A planetary gear reduction device for super high speed reduction is disclosed. The planetary gear reduction device for super high speed reduction, according to one embodiment of the present invention, includes a planetary gear reduction unit providing a primary reduced speed obtained by primarily reducing a rotational speed of a motor, and an inscribed planetary gear reducer having an input shaft module, which has an end portion connected to the planetary gear reduction unit and is formed by coupling at least two parts as one body, and an output shaft module for outputting a secondary reduced speed by further reducing the primary reduced speed by an interaction with the input shaft module.

14 Claims, 16 Drawing Sheets

(51) Int. Cl.
*F16H 1/46* (2006.01)
*F16H 57/02* (2012.01)

(52) U.S. Cl.
CPC .................. *F16H 2001/323* (2013.01); *F16H 2057/02034* (2013.01); *F16H 2057/02073* (2013.01)

(58) Field of Classification Search
USPC ................................................ 475/177–179
See application file for complete search history.

(56) References Cited

U.S. PATENT DOCUMENTS

| | | | | |
|---|---|---|---|---|
| 8,663,049 | B1* | 3/2014 | Yao | F16H 1/32 475/178 |
| 8,684,879 | B2* | 4/2014 | Nakamura | F16H 3/70 475/179 |
| 8,893,569 | B2* | 11/2014 | Lim | F16H 55/10 74/89.11 |
| 9,033,840 | B2* | 5/2015 | Nomura | F16H 1/32 475/150 |
| 2002/0052262 | A1 | 5/2002 | Lim | |
| 2013/0186213 | A1 | 7/2013 | Lim | |

FOREIGN PATENT DOCUMENTS

| | | |
|---|---|---|
| EP | 2119940 A1 | 11/2009 |
| JP | 02-077347 U | 6/1990 |
| JP | 2003532029 A | 10/2003 |
| JP | 2005061519 A | 3/2005 |
| JP | 2007078010 A | 3/2007 |
| JP | 2013533442 A | 8/2013 |
| KR | 10-2000-0020021 A | 4/2000 |
| KR | 10-0301120 B1 | 9/2001 |
| KR | 10-2005-0022902 A | 3/2005 |
| KR | 10-1508741 B1 | 4/2015 |
| WO | 01/081789 A | 11/2001 |
| WO | 0181789 A1 | 11/2001 |

OTHER PUBLICATIONS

International Search Report and Written Opinion dated Oct. 13, 2017 for PCT/KR2017/007863 to Sejin-igb Co., Ltd. filed Jul. 21, 2017.
Office Action dated Aug. 6, 2019 from Europe Patent Application No. 17846839.3 to Sejin-igb Co., Ltd.
Office Action dated Aug. 2, 2021 from Chinese Patent Application No. 201780053081.3 to Sejin-igb Co., Ltd.

* cited by examiner

PLANETARY GEAR REDUCTION DEVICE FOR SUPER HIGH SPEED REDUCTION

This is a US National stage of PCT patent application no. PCT/KR2017/007863, having an international filing date of Jul. 21, 2017, which claims the benefit of Korean patent application no. 10-2016-0112494, filed Sep. 1, 2016, hereby incorporated by reference in its entirety.

TECHNICAL FIELD

The present inventive concept relates to a planetary gear reduction device for super high speed reduction, and more particularly, to a planetary gear reduction device for super high speed reduction, which may provide a super high speed reduction ratio due to an efficient structure and may be easily applied to compact devices due to a lightweight and compact structure.

BACKGROUND ART

Planetary reduction gears, which are devices for generating a large driving force by reducing input torque, may be widely used throughout the industry.

For example, in automation and precision control devices, planetary reduction gears may be used to reduce and transfer a high-load rotational speed transferred through a driving shaft of a power source such as an electric motor or a servo motor.

A typical planetary reduction gear may include a sun gear disposed at a center shaft, a plurality of planetary gears circumscribing the sun gear, and a ring gear disposed radially outside the planetary gears and circumscribing the planetary gears.

In this state, when a rotation force is input to the sun gear, the rotation force is transferred and output to the planetary gears. Since the planetary gears not only rotate but also revolve along the ring gear, a certain speed reduction ratio may be obtained.

A speed reduction ratio provided by one planetary reduction gear has a preset value. In other words, a value obtained by dividing the number of gears of the ring gear and the sun gear by the number of gears of the sun gear may be a speed reduction ratio provided by the planetary reduction gear, which remains constant without a change.

Accordingly, to implement a higher speed reduction ratio, in particular, a super high speed reduction ratio, using two planetary reduction gears by connecting them may be considered.

However, when the planetary reduction gears are used by simply connecting them, the volume thereof increases, and thus it is difficult to apply the planetary reduction gears to a compact device such as an index. Thus, technology development regarding a new-concept speed reduction device that is compact and capable of providing a super high speed reduction ratio is necessary.

DETAILED DESCRIPTION OF THE INVENTIVE CONCEPT

Technical Problem

The present inventive concept provides a planetary gear reduction device for super high speed reduction, which may provide a super high speed reduction ratio due to an efficient structure and may be easily applied to compact devices due to a lightweight and compact structure.

Advantageous Effects

According to the present inventive concept, a super high speed reduction ratio may be provided due to an efficient structure and easy application to compact devices may be possible due to a lightweight and compact structure.

BEST MODE

Figure 1:
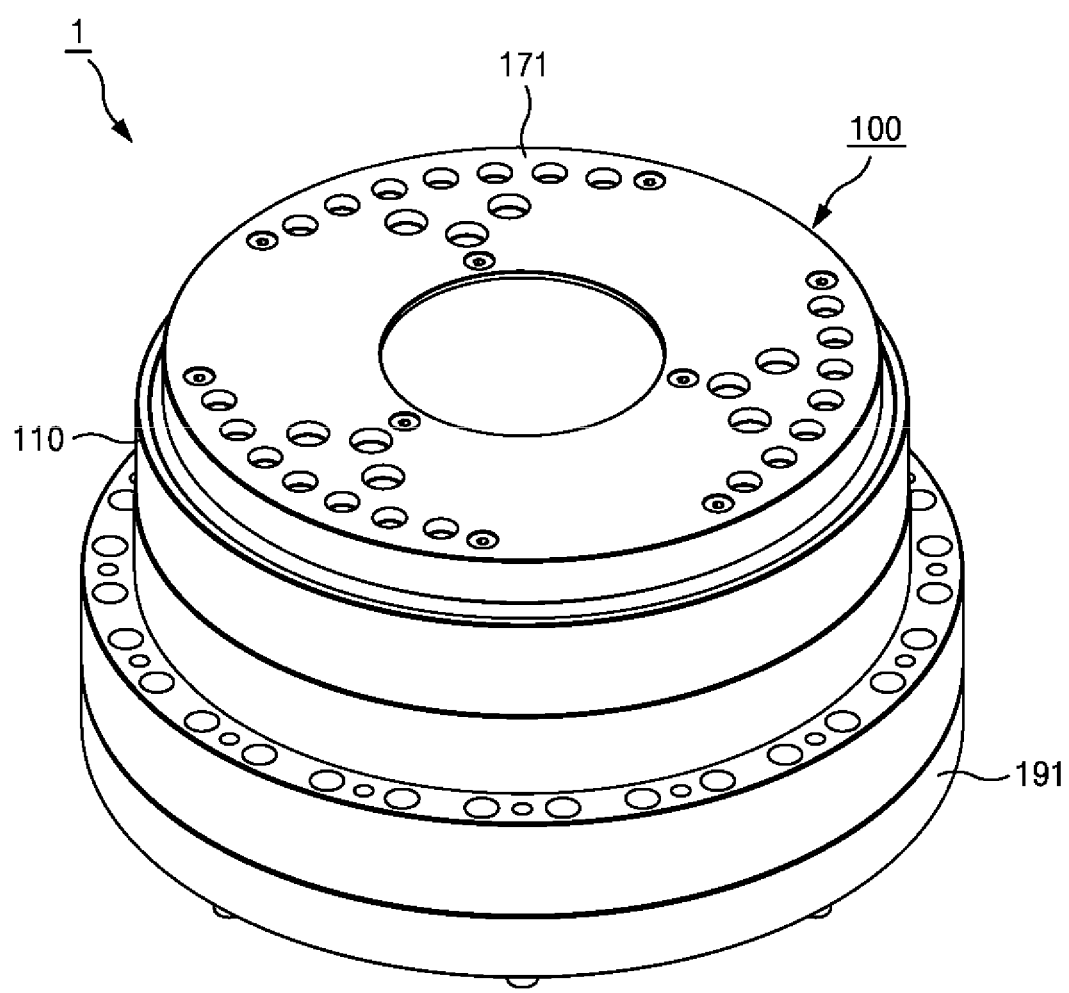
FIG. 1 is a perspective view of a planetary gear reduction device for super high speed reduction according to an embodiment.

According to an aspect of the present inventive concept, there is provided a planetary gear reduction device for super high speed reduction, which includes a planetary gear reduction unit providing a primary reduced speed obtained by primarily reducing a rotational speed of a motor, and an inscribed planetary gear reducer having an input shaft module, which has an end portion connected to the planetary gear reduction unit and is formed by coupling at least two parts as one body, and an output shaft module for outputting a secondary reduced speed by further reducing the primary reduced speed by an interaction with the input shaft module.

The input shaft module of the inscribed planetary gear reducer may include a first input shaft module having one end portion disposed at a side of the output shaft module, and a second input shaft module having one side coupled to the first input shaft module and another side connected to the planetary gear reduction unit.

The first input shaft module may include a first module head disposed at the side of the output shaft module and having an outer surface to which an input gear is connected, and a first module shaft connected to the second module head, wherein the second input shaft module may include a second module hollow body having an empty hollow shape and into which the first module shaft is inserted, and a second module flange formed on an end portion of the second module hollow body to be greater than a diameter of the second module hollow body.

A key block for key coupling may be provided on one of the first module shaft of the first input shaft module and the second module hollow body of the second input shaft module, and a key groove to which the key block is coupled may be formed in another part, wherein the first module shaft of the first input shaft module and the second module hollow body of the second input shaft module may be key-coupled and fixed by a bolt, forming one body.

The planetary gear reduction unit may include a primary reduction sun gear rotatably disposed at a center portion of the second module flange of the second input shaft module, and a plurality of primary reduction planetary gears meshed with the primary reduction sun gear radially outside the primary reduction sun gear.

The planetary gear reduction unit may further include a ring gear plate coupled to a rear surface of the inscribed planetary gear reducer and having a center portion in which a primary reduction ring gear portion meshed with the plurality of primary reduction planetary gears is formed.

A sun gear connection device greater than a diameter of the primary reduction sun gear may be integrally provided at one side of the primary reduction sun gear, and a motor shaft connection member, to which a motor shaft of the motor is connected, may be coupled to the sun gear connection device.

The planetary gear reduction unit may further include a motor shaft connection bearing coupled to the outside of the motor shaft connection member and guiding rotation of the motor shaft connection member, and a bearing support member supporting the motor shaft connection bearing.

The sun gear connection device and the motor shaft connection member may be coupled to each other by an interference fit method, and a plurality of cut slots may be formed in an end portion of the motor shaft connection member along a circumferential direction thereof.

The planetary gear reduction unit may further include a clamp selectively clamping a region of the plurality of cut slots of the motor shaft connection member, and a motor installation plate coupled to a rear surface of the inscribed planetary gear reducer for installation of the motor.

The inscribed planetary gear reducer may further include an internal gear integrated main body forming a place where the input shaft module and the output shaft module are mounted, wherein an internal gear is integrally formed on an inner wall, and an end cover coupled to one side of the internal gear integrated main body forming a place in which the planetary gear reduction unit is installed.

The inscribed planetary gear reducer may further include a plurality of isotropic single-stage planetary gears disposed at the side of the output shaft module in a circumferential direction of the first module head and meshed with the input gear of the first module head and engaged therewith, and a plurality of crank shafts including a rotation shaft having one end portion connected to the isotropic single-stage planetary gear and rotated by rotation of the isotropic single-stage planetary gear, and a plurality of eccentric cam connected to the rotation shaft with a phase difference of a predetermined interval.

The inscribed planetary gear reducer may further include a plurality of conjugate planetary gears having a center portion in which a module through hole through which the input shaft module passes is formed and an outer wall on which an outer gear meshed with the internal gear of the internal gear integrated main body, and connected to an eccentric cam of the crank shaft to perform translational rotation according to rotation of the crank shaft.

The output shaft module may include a flat output shaft having a center portion in which an input gear of the input shaft module is disposed, and a precession prevention plate coupled to the flat output shaft and preventing generation of a precessional motion.

The output shaft module may further include a vibration reduction pin coupled to the flat output shaft and the precession prevention plate and reducing output vibration.

MODE OF THE INVENTIVE CONCEPT

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Figure 2:
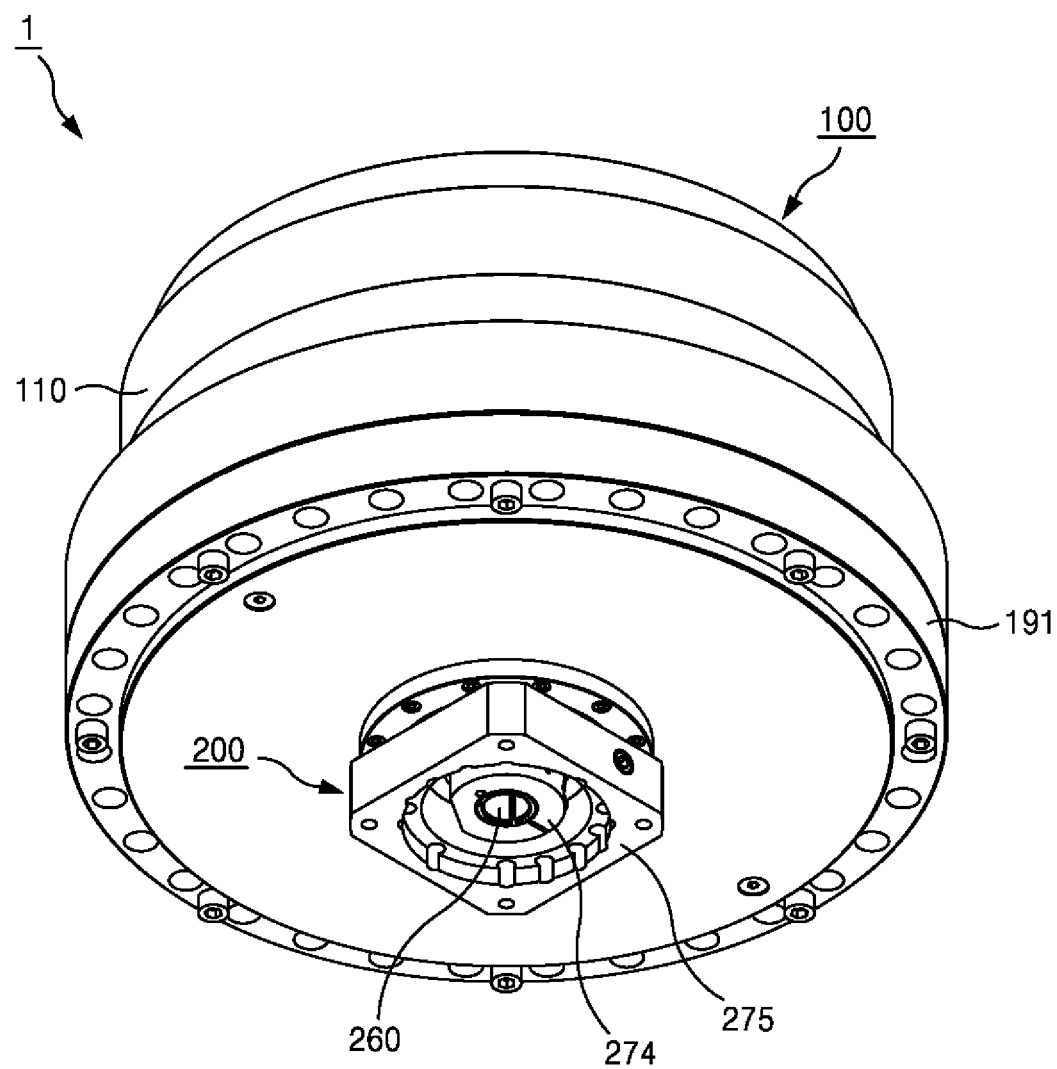
FIG. 2 is a bottom perspective view of FIG. 1.
Figure 3:
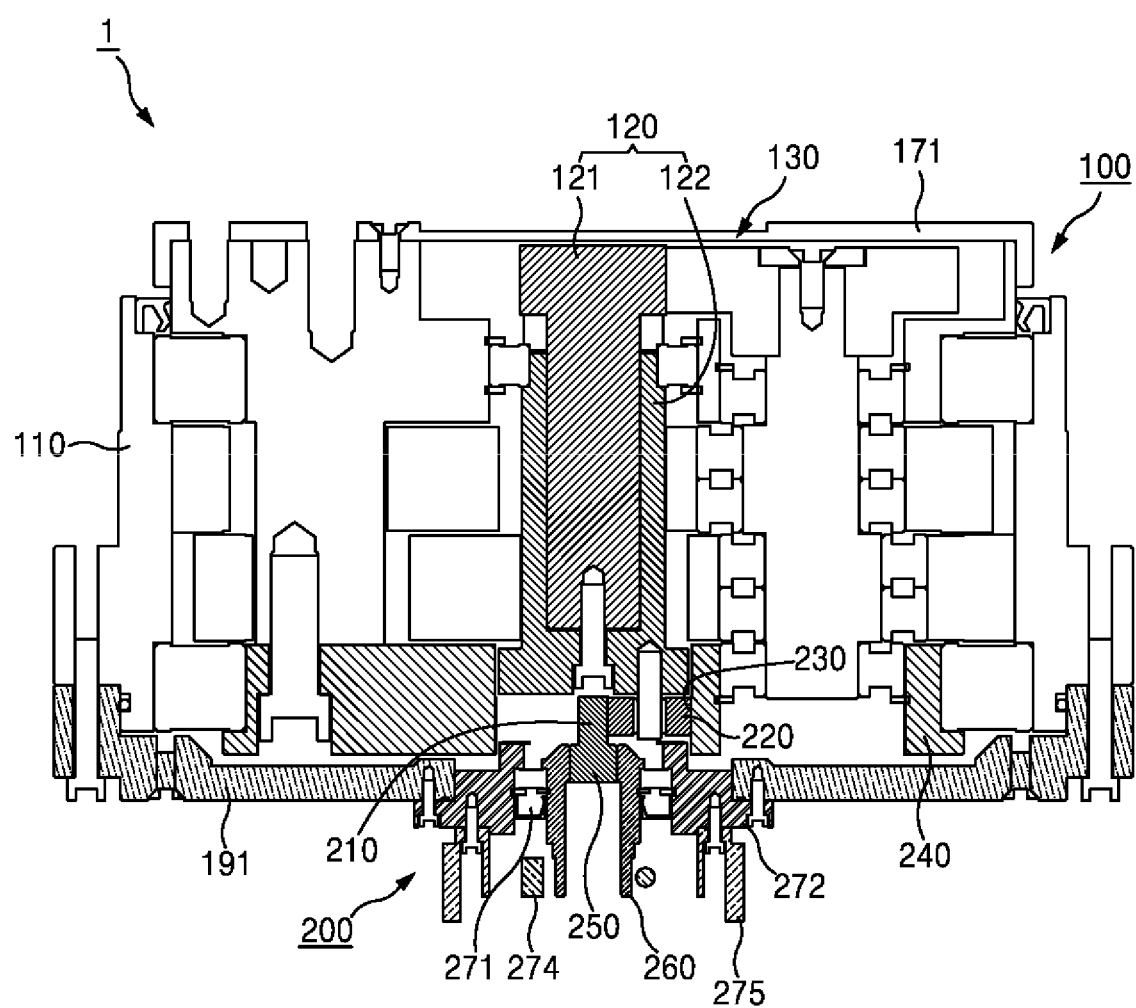
FIG. 3 is a partially vertical sectional view of FIG. 1.
Figure 4:
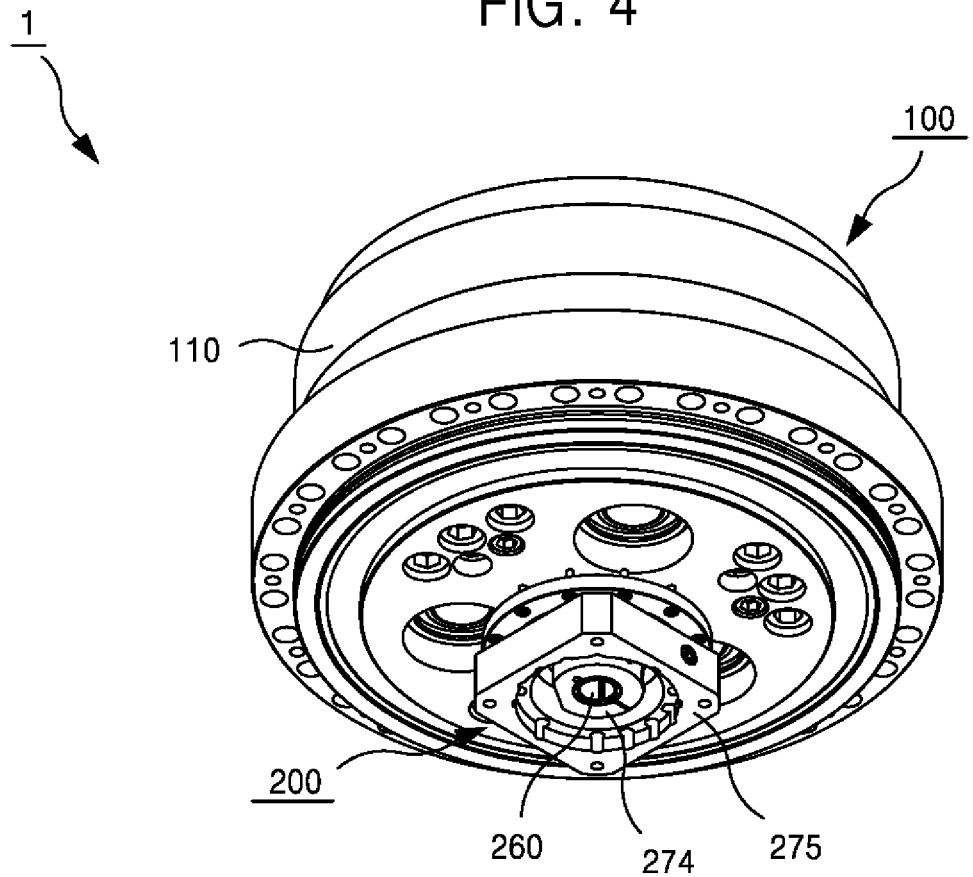
FIG. 4 illustrates that an end cover is disassembled from FIG. 2.
Figure 4:
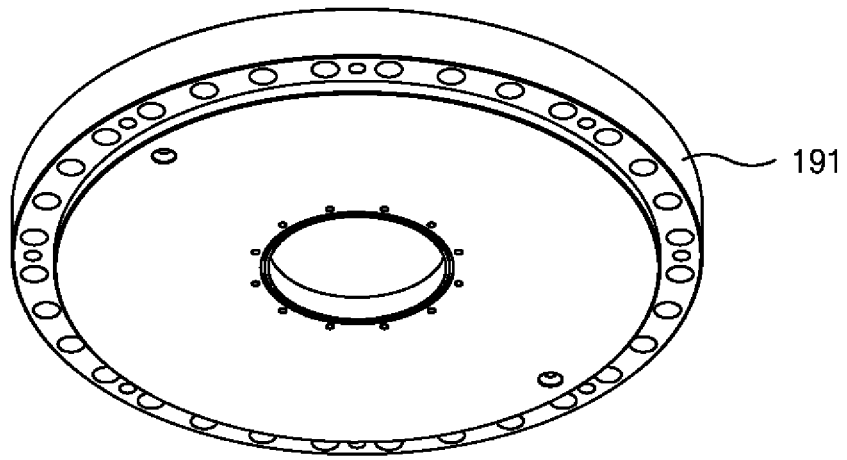
Figure 5:
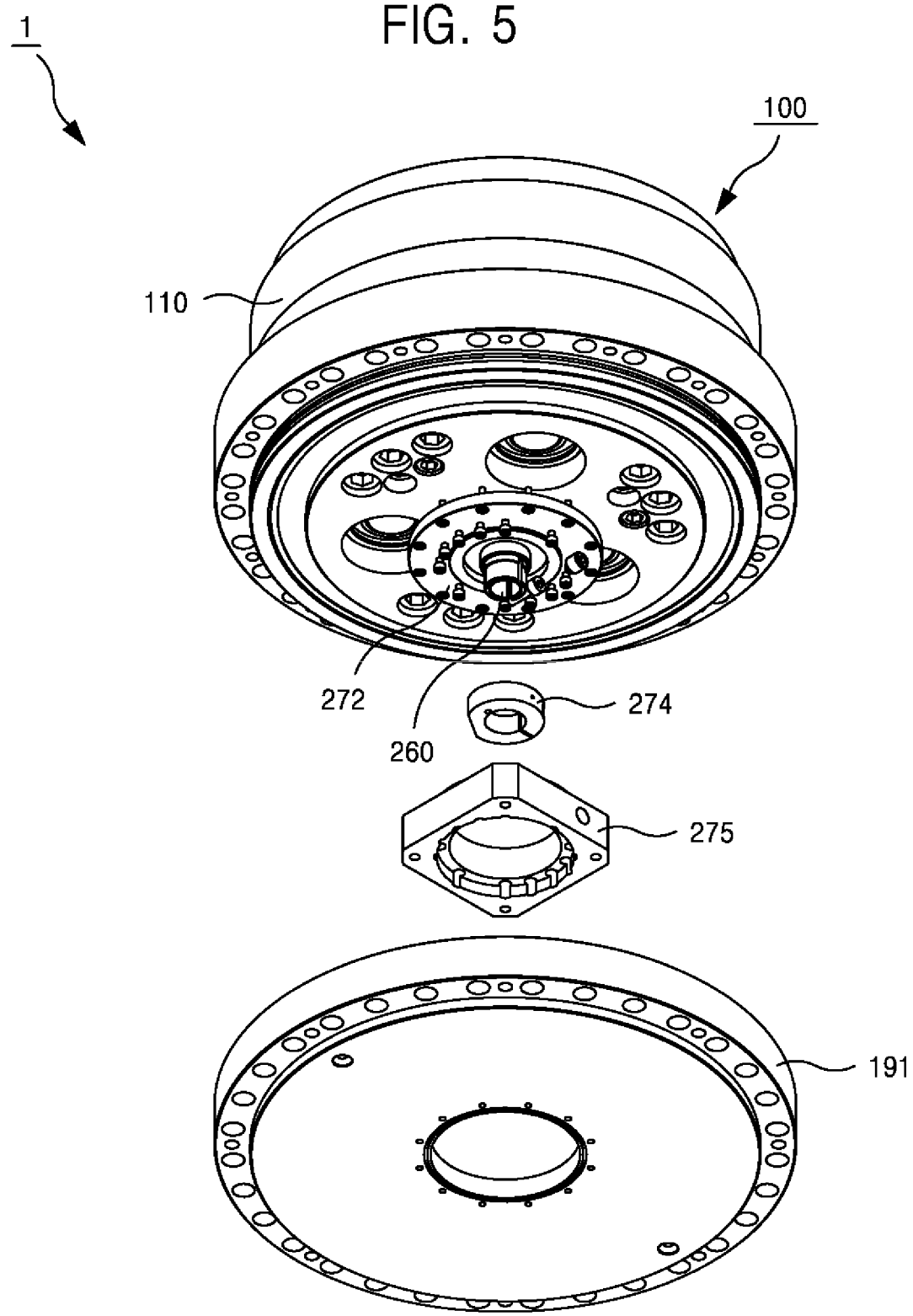
FIG. 5 illustrates that a clamp and a motor installation plate are disassembled from FIG. 4.
Figure 6:
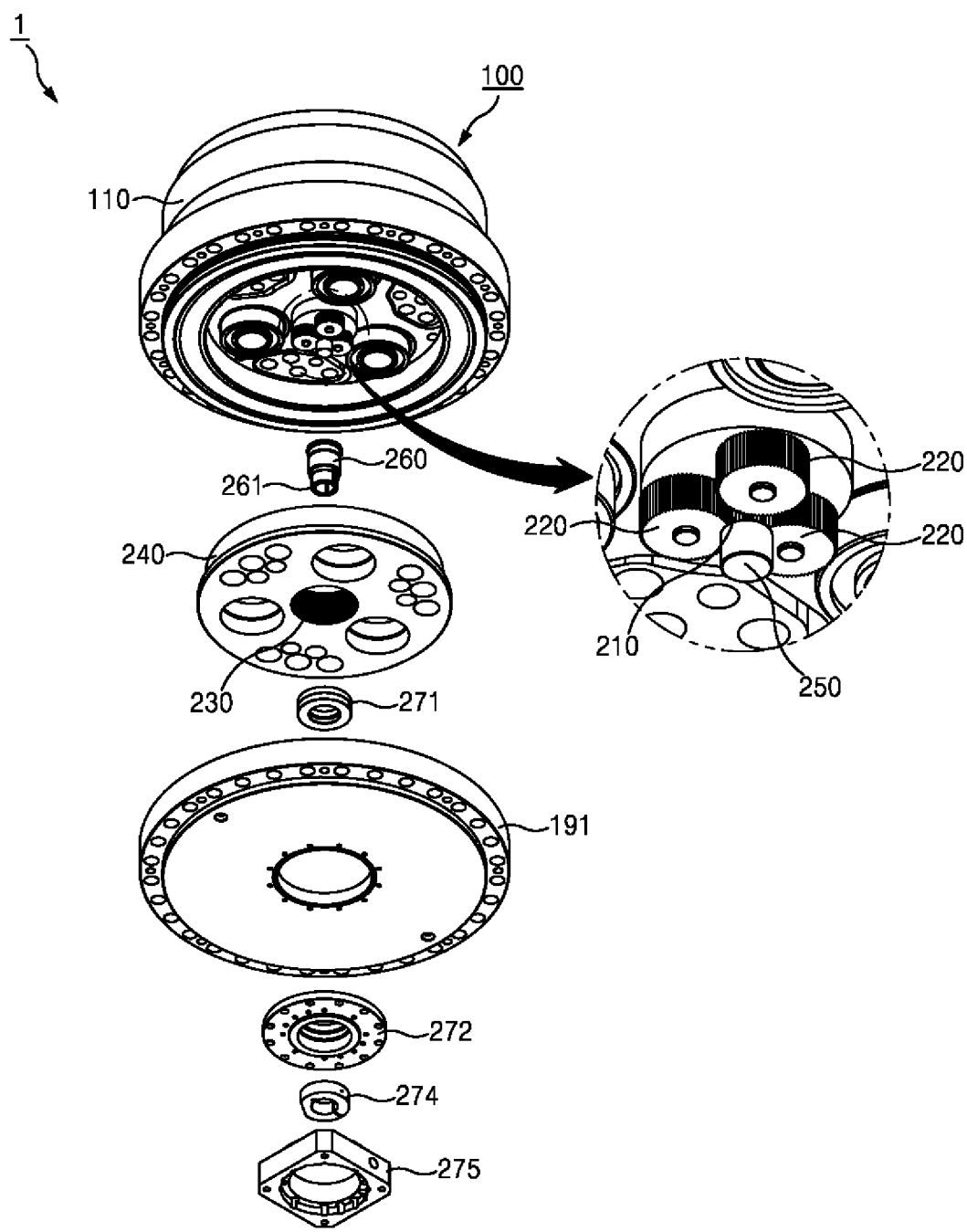
FIG. 6 illustrates that a part of a planetary gear reduction unit is further disassembled from FIG. 5.
Figure 7:
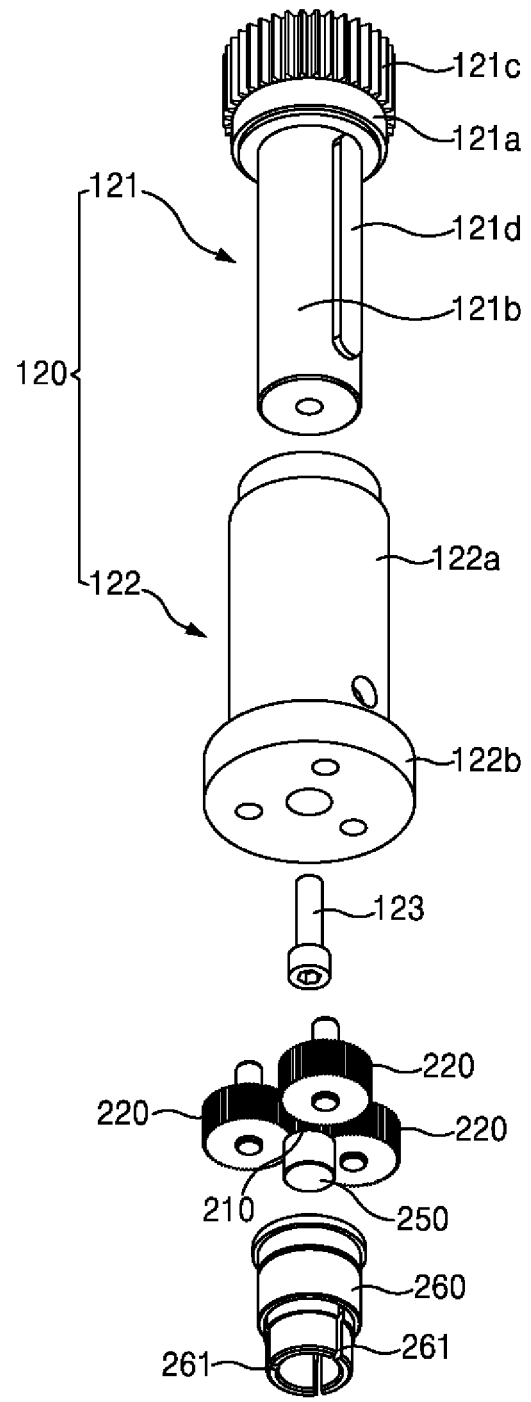
FIG. 7 is an exploded view of an input shaft module and a part of the planetary gear reduction unit.
Figure 8:
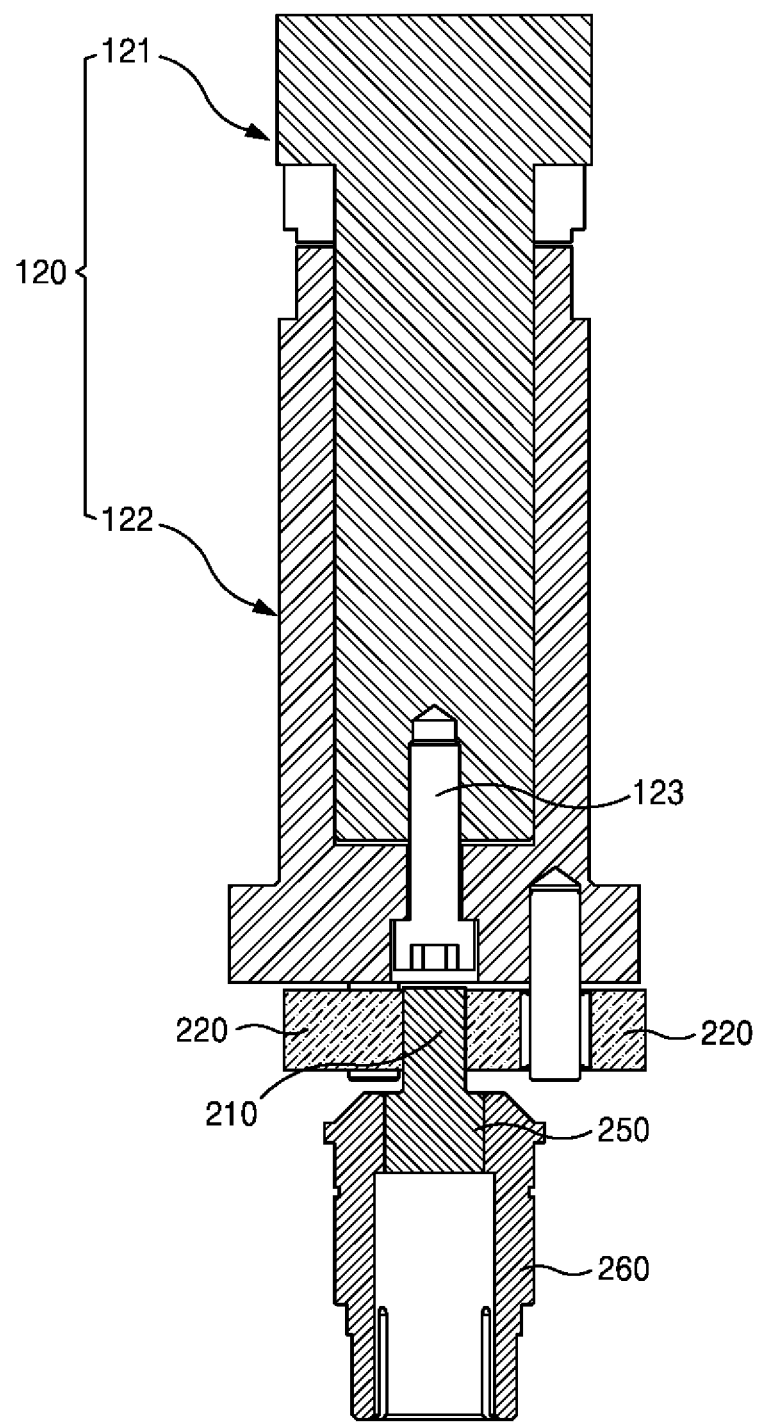
FIG. 8 is an assembled sectional view of FIG. 7.
Figure 9:
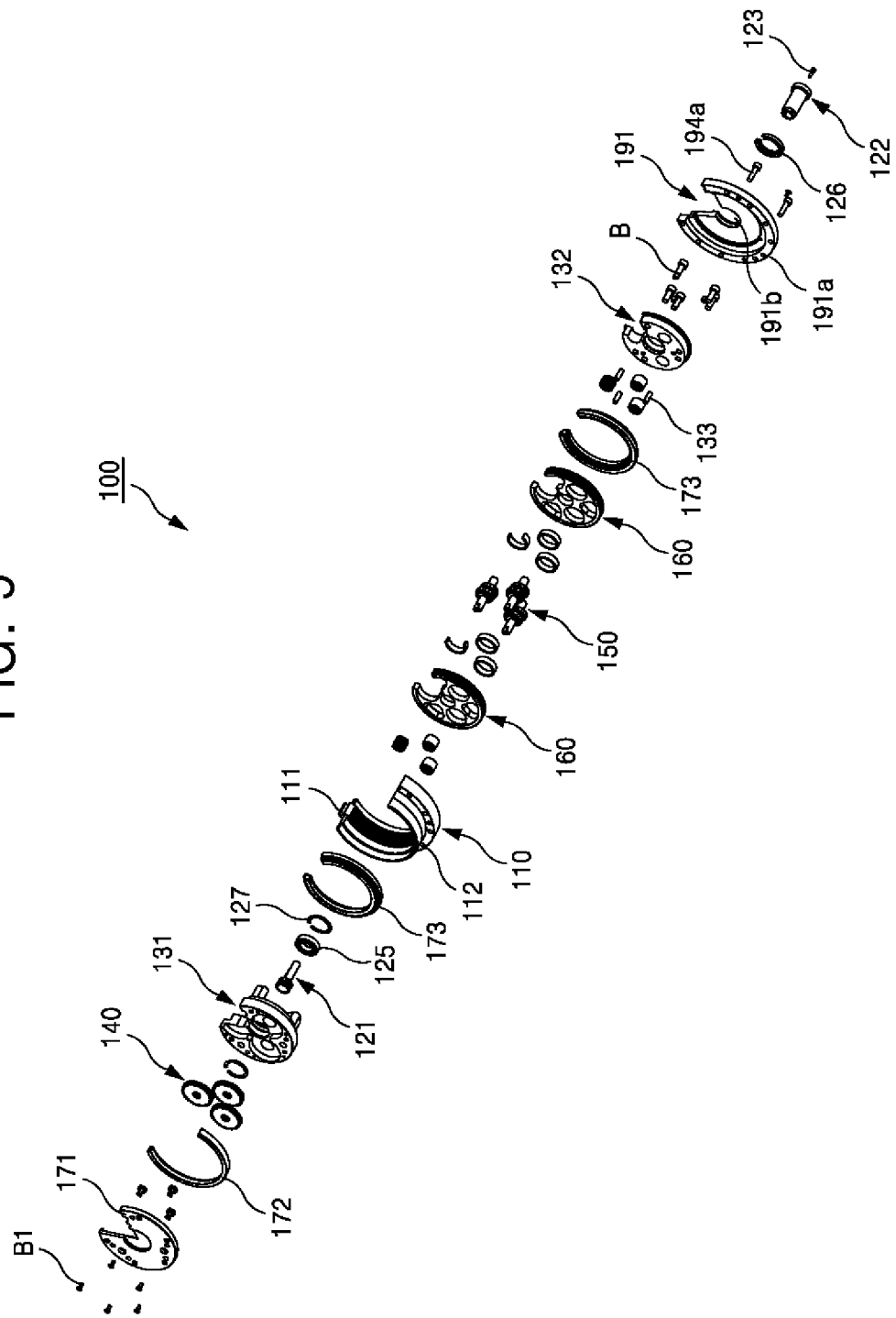
FIG. 9 is an exploded view of an inscribed planetary gear reducer.
Figure 10:
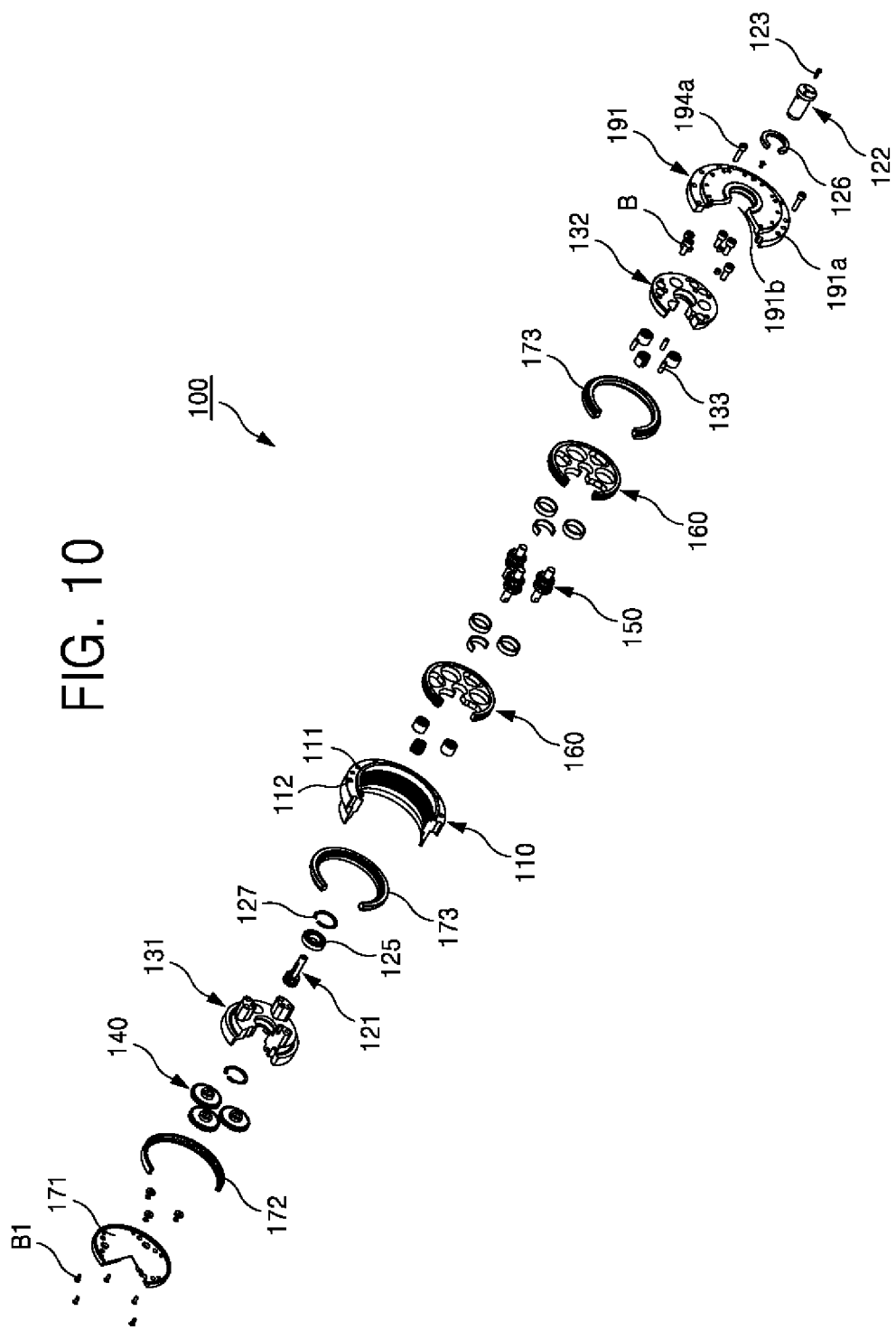
FIG. 10 is a bottom view of FIG. 9.
Figure 11:
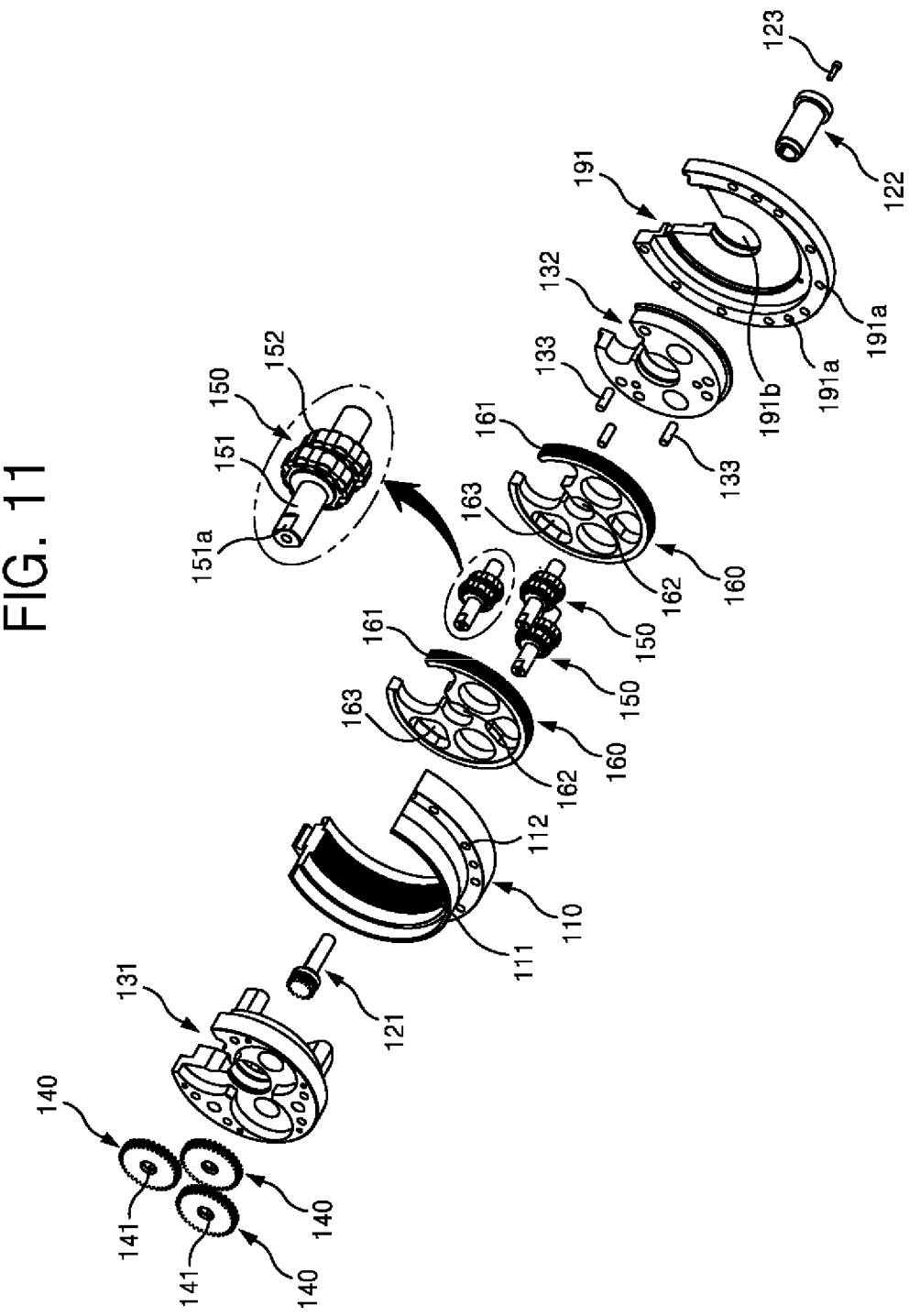
FIGS. 11 and 12, respectively, illustrate only some parts of FIGS. 9 and 10.
Figure 12:
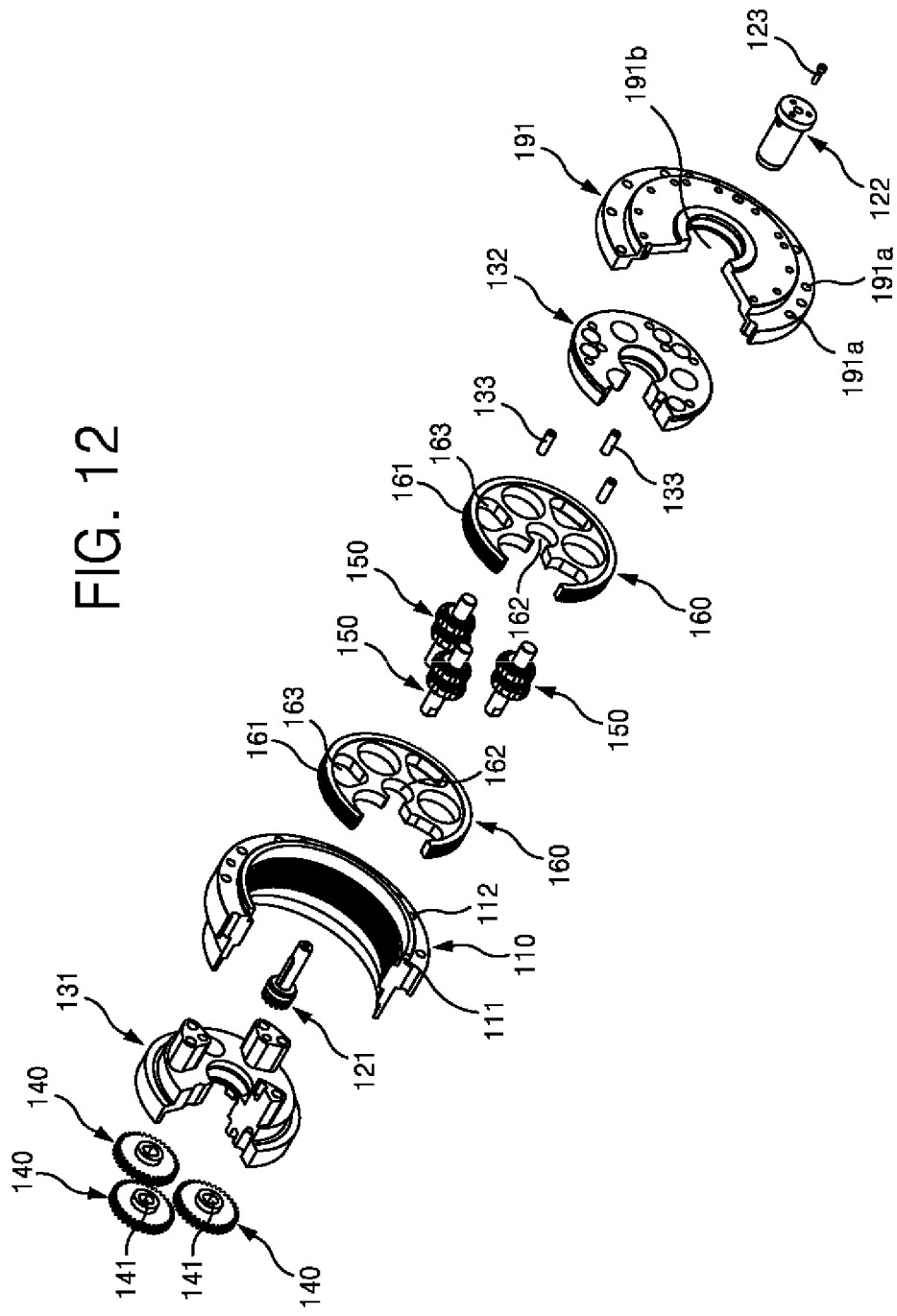
Figure 13:
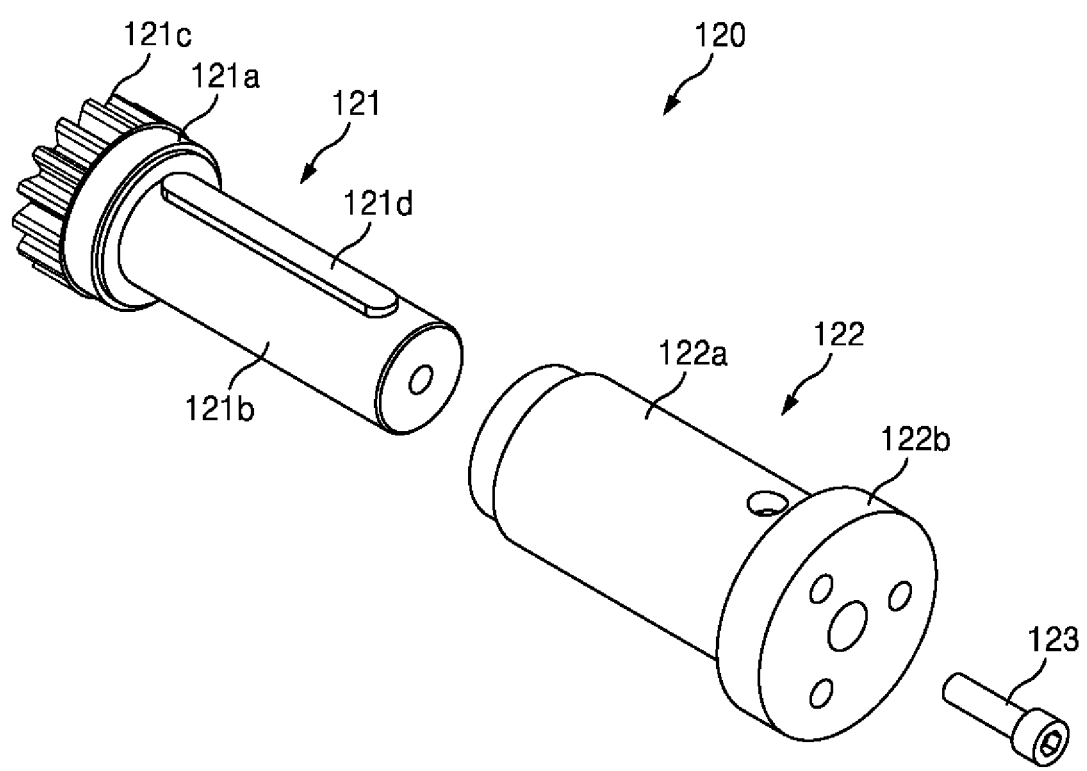
FIGS. 13 and 14 are exploded views of the input shaft module.
Figure 14:
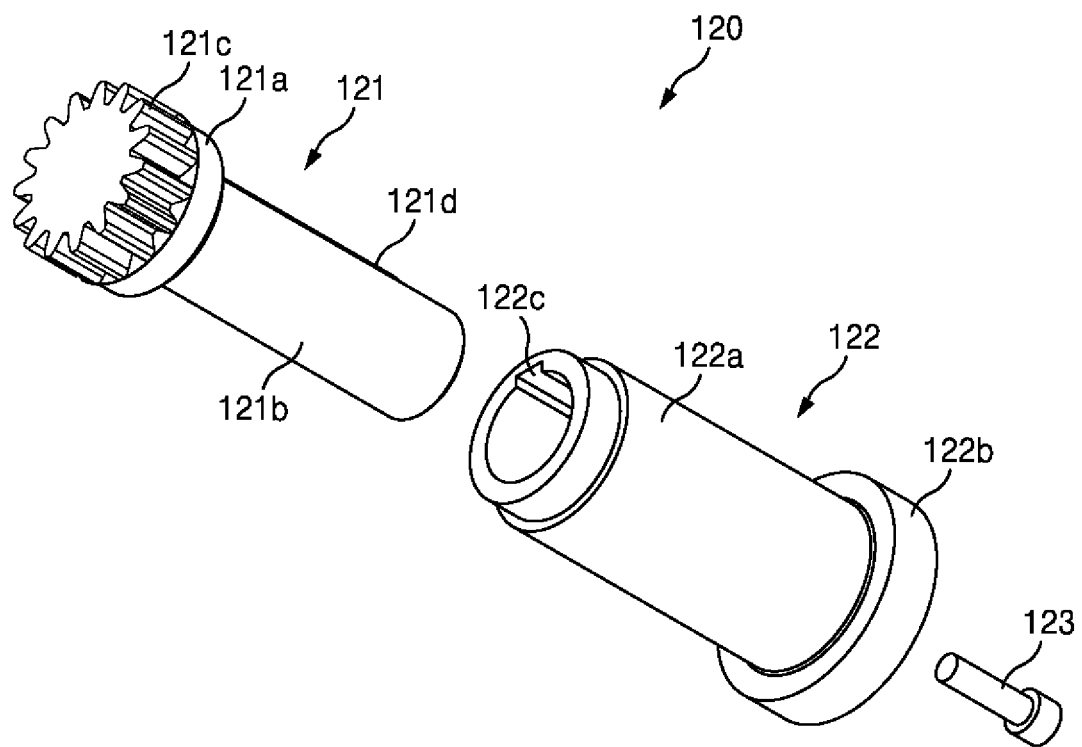
Figure 15:
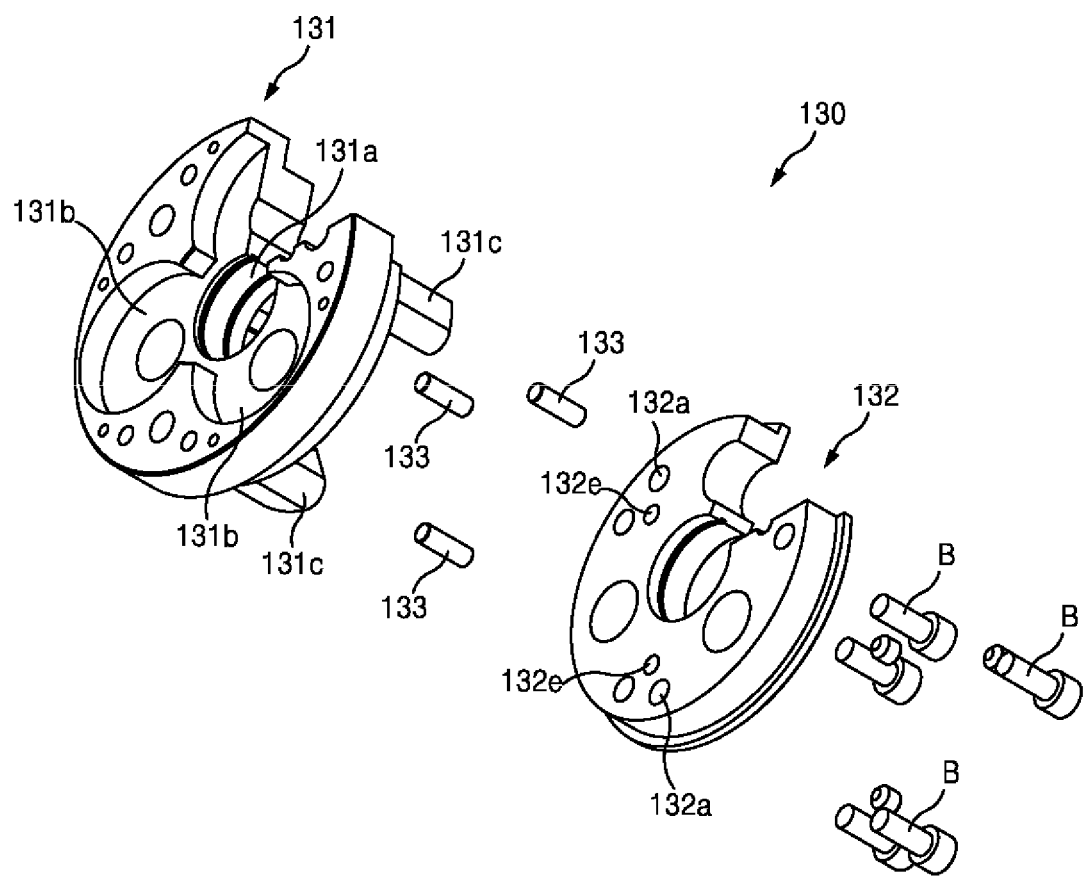
FIGS. 15 and 16 are exploded views of an output shaft module.
Figure 16:
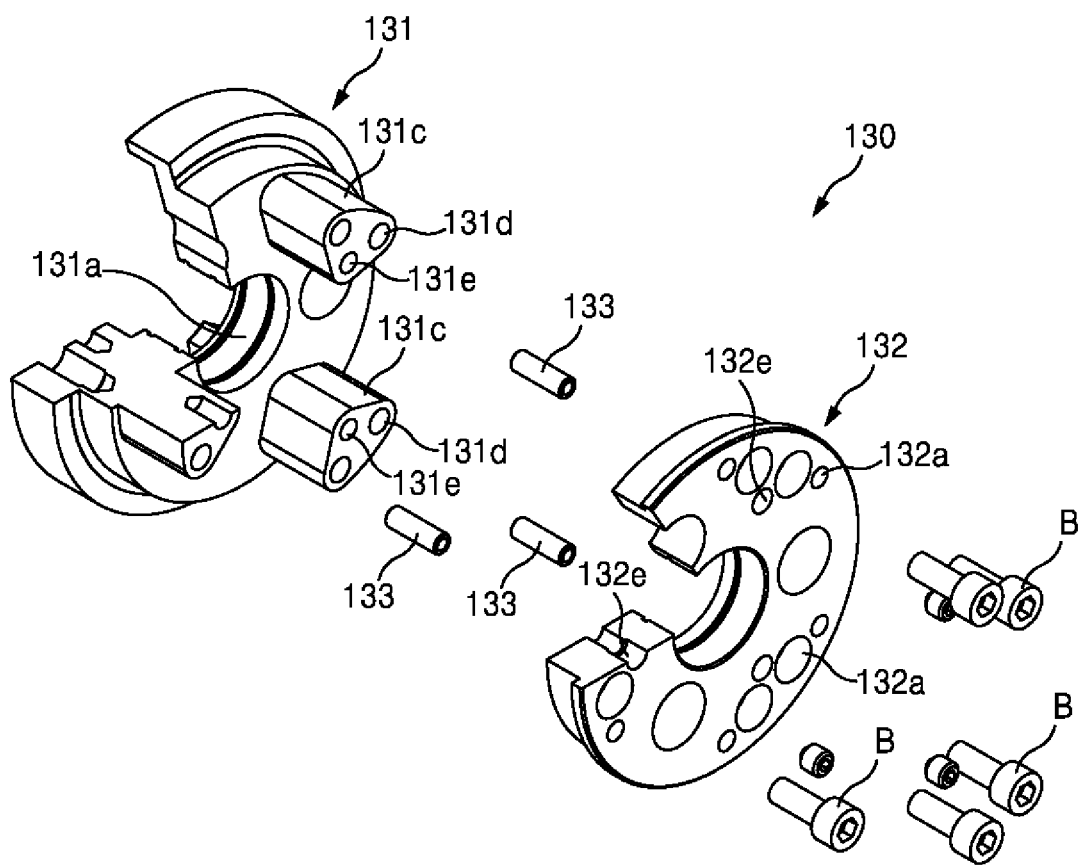

FIG. 1 is a perspective view of a planetary gear reduction device for super high speed reduction according to an embodiment. FIG. 2 is a bottom perspective view of FIG. 1. FIG. 3 is a partially vertical sectional view of FIG. 1. FIG. 4 illustrates that an end cover is disassembled from FIG. 2. FIG. 5 illustrates that a clamp and a motor installation plate are disassembled from FIG. 4. FIG. 6 illustrates that a part of a planetary gear reduction unit is further disassembled from FIG. 5. FIG. 7 is an exploded view of an input shaft module and a part of the planetary gear reduction unit. FIG. 8 is an assembled sectional view of FIG. 7. FIG. 9 is an exploded view of an inscribed planetary gear reducer. FIG. 10 is a bottom view of FIG. 9. FIGS. 11 and 12, respectively, illustrate only some parts of FIGS. 9 and 10. FIGS. 13 and 14 are exploded views of the input shaft module. FIGS. 15 and 16 are exploded views of an output shaft module.

Referring to these drawings, a planetary gear reduction device 1 for super high speed reduction according to the present embodiment, which may provide a super high speed reduction ratio due to an efficient structure and may be easily applied to compact devices due to a light and thin structure, may include a planetary gear reduction unit 200 (mainly see FIGS. 2 to 8) to which a motor (not shown) is connected, and an inscribed planetary gear reducer 100 (mainly see FIG. 1 and FIGS. 9 to 16) to which the planetary gear reduction unit 200 is coupled.

A coupling structure of the planetary gear reduction device 1 for super high speed reduction according to the present embodiment, in which the planetary gear reduction unit 200 is coupled to one side of the inscribed planetary gear reducer 100, in particular, to an end portion of an input shaft module 120, as illustrated in FIGS. 2 and 3, may provide a lightweight and compact structure as illustrated in FIG. 3 and also implement a super high speed reduction ratio due to structural characteristics thereof. In other words, the rotational speed of the motor is primarily reduced by the planetary reduction gear 100, and then secondarily reduced and output by the inscribed planetary gear reducer 100. Thus, a large torque may be generated and also a super high speed reduction ratio may be implemented.

In the following description, for convenience of explanation, the inscribed planetary gear reducer 100 is first described with reference to FIG. 1 and FIGS. 9 to 16, and then the planetary gear reduction unit 200 is described with reference to FIGS. 2 to 8.

First, the inscribed planetary gear reducer 100 is described. As illustrated in FIG. 1 and FIGS. 9 to 16, the inscribed planetary gear reducer 100 outputs a secondary reduced speed by further reducing a primary reduced speed input from the planetary gear reduction unit 200.

The inscribed planetary gear reducer 100 may include an internal gear integrated main body 110 in which a plurality of parts for speed reduction are mounted, an end cover 191 coupled to one side of the internal gear integrated main body 110 and forming a place for installing the planetary gear reduction unit 200, an input shaft module 120 (see FIGS. 13 and 14) to which the primary reduced speed obtained by primarily reducing the rotational speed of the motor is input from the planetary gear reduction unit 200, and an output shaft module 130 (see FIGS. 15 and 16) that outputs the secondary reduced speed by further reducing the primary reduced speed.

When the inscribed planetary gear reducer 100 is applied in the above-described compact structure, the input shaft module 120 may be easily installed at a desired position without restrictive conditions or separate auxiliary structure usage conditions, thereby reducing an installation volume and improving a speed reduction range compared to the related art.

The internal gear integrated main body 110 is a structure that is engaged with a conjugate planetary gear 160 to be described later, that is, a pair of conjugate planetary gears 160. For engagement with the conjugate planetary gears 160, an internal gear 111 is formed on an inner wall of the internal gear integrated main body 110. The internal gear 111 may be integrally formed on the inner wall of the internal gear integrated main body 110.

A plurality of through-holes 112 are formed along the circumference of in the internal gear integrated main body 110. The through-holes 112 are provided for coupling with the end cover 191 using bolts 194a (see FIGS. 9 and 10). In other words, the end cover 191 is coupled to an end portion of the internal gear integrated main body 110. For coupling of the end cover 191 to the internal gear integrated main body 110, through-holes 112 and 191a are formed in the internal gear integrated main body 110 and the end cover 191, respectively. Accordingly, as the bolts 194a are inserted in the through-holes 112 and 191a and coupled thereto, the internal gear integrated main body 110 and the end cover 191 may be coupled to each other.

A first passing hole 191b, through which elements of the planetary gear reduction unit 200, that is, a motor shaft connection member 260, which are connected to the input shaft module 120, in particular, a second input shaft module 122, pass, is formed at a center of the end cover 191.

The input shaft module 120 is a portion connected to the internal gear integrated main body 110 and receiving the primary reduced speed obtained by primarily reducing the rotational speed of the motor from the planetary gear reduction unit 200. In other words, when the motor operates, the rotational speed is primarily reduced by the planetary gear reduction unit 200 and then transferred directly to the input shaft module 120.

In the present embodiment, the input shaft module 120 is separated into at least two parts, and then the two parts are coupled to each other forming one body.

In detail, when the input shaft module 120 is applied in one body as in the related art, and a tooth profile of an outer circumference surface of a rear end portion of an input shaft is greater than center space of the reduction gear, the input shaft may not pass through the center space of the reduction gear main body and installation thereof becomes impossible. Accordingly, a separate auxiliary structure for installation is necessary, and thus the volume thereof may be difficult to be reduced. Thus, implementation of a low speed reduction ratio may be relatively limited.

However, as in the present embodiment, when the input shaft module 120 is separated into at least two parts, and then the two parts are coupled to each other forming one body, the above-described problem may be solved. In other words, the second input shaft module 122 is connected to the side of the planetary gear reduction unit 200, and a first input shaft module 121 is disposed at the opposite side and coupled to the second input shaft module 122. Accordingly, there is no need to increase the diameter of the first input shaft module 121, and thus no limitation exists for installation and further no separate auxiliary structure is necessary. In particular, an input gear 121c formed at an end portion of the first input shaft module 121 is disposed at a flat output shaft 131 of an output shaft module 130, and thus reduction of the installation volume may be implemented and the implementation of a low speed reduction ratio may be relatively advantageous.

The input shaft module 120 that functions as above may include, as illustrated in detail in FIGS. 13 and 14, the first input shaft module 121 having one end portion disposed at the side of the flat output shaft 131 of the output shaft module 130, and the second input shaft module 122 having one side coupled to the first input shaft module 121 and the other side connected to the planetary gear reduction unit 200. As described below in detail, a plurality of primary reduction planetary gears 220 constituting the planetary gear reduction unit 200 are connected to the second input shaft module 122.

The first input shaft module 121 may include a first module head 121a disposed at the side of the flat output shaft 131 of the output shaft module 130 and having an outer surface to which the input gear 121c is connected, and a first module shaft 121b connected to the first module head 121a and inserted into the second input shaft module 122. The input gear 121c formed on the outer surface of the first module head 121a has a wedge type tooth profile, and thus an operation thereof may be flexible.

The second input shaft module 122 may include a second module hollow body 122a having an empty hollow shape and into which the first module shaft 121b is inserted, and a second module flange 122b formed on an end portion of the second module hollow body 122a and having a diameter greater than that of the second module hollow body 122a.

Meanwhile, when the first input shaft module 121 and the second input shaft module 122 are coupled to each other, the first input shaft module 121 and the second input shaft module 122 may not be arbitrarily rotated. In other words, the first input shaft module 121 may not rotate idle relative to the second input shaft module 122 to which the planetary gear reduction unit 200 is coupled.

To this end, a key block 121d is provided on an outer wall of the first module shaft 121b, and a key groove 122c into which the key block 121d is inserted to have a shape fit is formed in an inner wall of the second module hollow body 122a. Accordingly when the first input shaft module 121 and the second input shaft module 122 are coupled to each other, the key block 121d and the key groove 122c are coupled to fit each other, and thus the idling of the first input shaft module 121 may be prevented.

Furthermore, a bolt 123 is used to make the first input shaft module 121 and the second input shaft module 122 that are key-coupled to each other, one body. In other words, the first module shaft 121b of the first input shaft module 121 and the second module hollow body 122a of the second input shaft module 122 after key-coupled through the key block 121*d* and the key groove 122*c*, are fixed by the bolt 123 forming the input shaft module 120 like one body, that is, one structure.

To facilitate smooth rotation of the input shaft module 120 and further prevent leakage of oil provided to the input shaft module 120, an input shaft support bearing 125 and an input shaft oil seal 126 are provided around the input shaft module 120. A C-ring 127 for supporting the input shaft support bearing 125 is provided around the input shaft support bearing 125.

The output shaft module 130 is connected to the input shaft module 120 through a plurality of parts and interacts with each other, and further reduces the primary reduced speed input from the input shaft module 120 to output the secondary reduced speed. In other words, the output shaft module 130 much reduces the rotational speed of the motor and outputs a large torque.

The output shaft module 130 may include, mainly as illustrated in FIGS. 15 and 16, the flat output shaft 131 with the input gear 121*c* of the input shaft module 120 arranged at a center portion thereof and a precession prevention plate 132 coupled to the flat output shaft 131 and preventing generation of a precessional motion.

An input gear arrangement portion 131*a* where the input gear 121*c* of the first input shaft module 121 is arranged is formed at a center of the flat output shaft 131. A plurality of planetary gear arrangement portions 131*b* where a plurality of isotropic single-stage planetary gears 140 that are meshed with the input gear 121*c* are rotatably arranged are formed around the input gear arrangement portion 131*a*. The centers of the input gear arrangement portion 131*a* and the planetary gear arrangement portions 131*b* may have a through-hole shape for connection with neighboring structures.

A plurality of separation legs 131*c* are formed at one side of the flat output shaft 131 facing the precession prevention plate 132, and bolt holes 131*d* are formed in the separation legs 131*c*. The separation legs 131*c* are plurally provided along the circumferential direction of the flat output shaft 131. The flat output shaft 131 and the precession prevention plate 132 may be coupled to each other by being separated from each other by the length of the separation legs 131*c* due to the separation legs 131*c*.

Through-holes 132*a* communicated with the bolt holes 131*d* of the separation legs 131*c* are formed in the precession prevention plate 132. Accordingly, as the bolts B are inserted into the through-holes 132*a* of the precession prevention plate 132 and coupled to the bolt holes 131*d* formed in the separation legs 131*c* of the flat output shaft 131, the flat output shaft 131 and the precession prevention plate 132 may be connected as one body.

Vibration reduction pins 133 for reducing output vibration are coupled between the flat output shaft 131 and the precession prevention plate 132. The vibration reduction pins 133 may be plurally employed with a separation interval therebetween. Pin holes 131*e* and 132*e* are respectively formed in the flat output shaft 131 and the precession prevention plate 132 such that the vibration reduction pins 133 may be coupled between the flat output shaft 131 and the precession prevention plate 132. The pin hole 131*e* formed in the flat output shaft 131 may be arranged around the bolt holes 131*d* of the separation legs 131*c*.

Meanwhile, according to the present embodiment, a plurality of isotropic single-stage planetary gears 140, a plurality of crank shafts 150, and a plurality of conjugate planetary gears 160 for speed reduction, that is, as means for further reducing the primary reduced speed input from the input shaft module 120 to output the further reduced speed to the secondary reduced speed are provided in the inscribed planetary gear reducer 100.

The isotropic single-stage planetary gears 140 are arranged in a circumferential direction of the first module head 121*a* forming the first input shaft module 121 of the input shaft module 120 and meshed with the input gear 121*c* of the first module head 121*a* to interact. In other words, when the input shaft module 120 is rotated by the motor, the isotropic single-stage planetary gears 140 meshed with the input gear 121*c* of the input shaft module 120 may be rotated as well.

The isotropic single-stage planetary gears 140 are arranged spaced apart from each other by an equal angle, are rotatably arranged respectively on the planetary gear arrangement portions 131*b* of the flat output shaft 131 forming the output shaft module 130, and are connected to the crank shafts 150. Since the crank shafts 150 is connected to the isotropic single-stage planetary gears 140 by passing through the flat output shaft 131, the centers of the planetary gear arrangement portions 131*b* are penetrated.

To prevent escape of the isotropic single-stage planetary gears 140 and for finishing of an end portion of the inscribed planetary gear reducer 100, an output shaft sealing cover 171 and an output shaft oil seal 172 are arranged adjacent to the isotropic single-stage planetary gears 140 and coupled to the flat output shaft 131.

The output shaft oil seal 172 is arranged between the output shaft sealing cover 171 and the flat output shaft 131, and the output shaft sealing cover 171 is coupled to the flat output shaft 131 by using bolts B1.

The crank shafts 150 are connected to the isotropic single-stage planetary gears 140 and the conjugate planetary gears 160. The crank shafts 150 may be provided as many as the number of the isotropic single-stage planetary gears 140. In the present embodiment, three isotropic single-stage planetary gears and three crank shafts are provided as the isotropic single-stage planetary gears 140 and the crank shafts 150, respectively. The crank shafts 150 may include a rotation shaft 151 having one end portion connected to the isotropic single-stage planetary gears 140 and rotated by the rotation of the isotropic single-stage planetary gears 140, and a plurality of eccentric cams 152 connected to the rotation shaft 151 with a phase difference of a predetermined interval.

To prevent idling of the crank shafts 150 and the isotropic single-stage planetary gears 140, a D-cut processing portion 151*a* is formed on one end portion of the rotation shaft 151, and a non-circular hole 141 to which the D-cut processing portion 151*a* is coupled is formed in each of the isotropic single-stage planetary gears 140.

According to the related art, a spline coupling may be considered to prevent the idling of the crank shafts 150 and the isotropic single-stage planetary gears 140. In this case, however, the number of teeth for implementation of a spline increases and thus it may be confused to select which one of the crank shafts 150 and the isotropic single-stage planetary gears 140 is used as a reference of assembly.

However, as in the present embodiment, when the D-cut processing portion 151*a* is formed on the one end portion of the rotation shaft 151, and the non-circular hole 141 is formed in each of the isotropic single-stage planetary gears 140 corresponding thereto, a phase may be easily identified during assembly of the crank shafts 150 and the isotropic single-stage planetary gears 140.

The eccentric cams 152 are structures connected to the rotation shaft 151 with a phase difference of a predetermined interval, and are connected one-by-one to the conjugate planetary gears 160. Although a plurality of support devices are used for the connection therebetween, illustration and description thereof are omitted.

A module through hole 162 through which the input shaft module 120 passes is formed at the center portion of each of the conjugate planetary gears 160, and an outer gear 161 meshed with the internal gear 111 of the internal gear integrated main body 110 is formed on an outer wall of each of the conjugate planetary gears 160. The conjugate planetary gears 160 are connected to the eccentric cams 152 of the crank shafts 150 and perform translational rotation according to the rotation of the crank shafts 150. As illustrated in the drawings, the conjugate planetary gears 160 may be provided in a pair.

A separation leg through hole 163 through which each of the separation legs 131c of the flat output shaft 131 passes is formed outside the center portion of each of the conjugate planetary gears 160. A conjugate output shaft support major-axis angular ball bearing 173 for supporting the conjugate planetary gears 160 may be coupled to both sides of the conjugate planetary gears 160.

Next, the planetary gear reduction unit 200 is described. As illustrated in FIGS. 2 to 8, the planetary gear reduction unit 200, as a reduction gear or speed reduction part connected to the motor that is not illustrated, transfers the primary reduced speed obtained by primarily reducing the rotational speed of the motor to the input shaft module 120 of the above-described inscribed planetary gear reducer 100.

As such, as the planetary gear reduction unit 200 transfers the primary reduced speed obtained by primarily reducing the rotational speed of the motor to the input shaft module 120 of the above-described inscribed planetary gear reducer 100, the planetary gear reduction unit 200 may be connected to the input shaft module 120, that is, the second input shaft module 122 of the input shaft module 120. In particular, the inscribed planetary gear reducer 100 may be connected to the second module flange 122b forming the second input shaft module 122.

The planetary gear reduction unit 200 may include a primary reduction sun gear 210, the primary reduction planetary gears 220, and a ring gear plate 240 having a primary reduction ring gear portion 230.

The primary reduction sun gear 210 is a gear rotatably arranged at a center portion of the second module flange 122b of the second input shaft module 122.

The primary reduction planetary gears 220 is meshed with the primary reduction sun gear 210 radially outside the primary reduction sun gear 210. In the present embodiment, three primary reduction planetary gears are provided at the same interval as the primary reduction planetary gears 220 and meshed with the primary reduction sun gear 210 outside the primary reduction sun gear 210.

Accordingly, when the primary reduction sun gear 210 rotates, the primary reduction planetary gears 220 may be rotated by being engaged therewith. In this state, the primary reduction planetary gears 220 not only rotate, but also revolve for speed reduction. To this end, the ring gear plate 240 is employed.

The ring gear plate 240 is a structure coupled to the rear surface of the inscribed planetary gear reducer 100, and the primary reduction ring gear portion 230 meshed with the primary reduction planetary gears 220 is formed at the center portion of the ring gear plate 240.

Accordingly, when the primary reduction sun gear 210 rotates, the primary reduction planetary gears 220 are rotated by being engaged therewith and revolved by the primary reduction ring gear portion 230, thereby primarily reducing the rotational speed of the motor. In this state, the speed reduction ratio may be a value obtained by dividing the number of teeth of the primary reduction ring gear portion 230 and the primary reduction sun gear 210 by the number of gears of the primary reduction sun gear 210, and thus the primary reduced speed may be set by previously appropriately designed.

Meanwhile, as described above, for the self-rotation or revolution of the primary reduction planetary gears 220, the primary reduction sun gear 210 is rotated. In this regard, the motor is directly connected to the primary reduction sun gear 210, and to this end, a sun gear connection device 250 and the motor shaft connection member 260 are provided.

The sun gear connection device 250 is a structure that is formed at one side of the primary reduction sun gear 210 to be greater than the diameter of the primary reduction sun gear 210. As illustrated in cross-sections of FIGS. 3 and 8, the primary reduction sun gear 210 and the sun gear connection device 250 may be an integrated structure.

The motor shaft connection member 260 has one side coupled to the sun gear connection device 250 and the other side connected to a motor shaft of the motor. In the present embodiment, the sun gear connection device 250 and the motor shaft connection member 260 may be coupled to each other by an interference fit method. Accordingly, when the motor operates and the motor shaft rotates, the primary reduction sun gear 210 may be rotated through the motor shaft connection member 260 and the sun gear connection device 250.

A plurality of cut slots 261 are formed at an end portion of the motor shaft connection member 260 along a circumferential direction thereof. The cut slots 261 may be used to facilitate insertion of the motor shaft.

A motor shaft connection bearing 271 for guiding the rotation of the motor shaft connection member 260 is provided outside the motor shaft connection member 260. The motor shaft connection bearing 271 is supported by a bearing support member 272. The bearing support member 272 is screw-coupled to the end cover 191 and may support the motor shaft connection bearing 271.

Meanwhile, the planetary gear reduction device 1 for super high speed reduction according to the present embodiment may further include a clamp 274 and a motor installation plate 275 for the installation of the motor.

The clamp 274 selectively clamps a region of the cut slots 261 of the motor shaft connection member 260. In other words, after the motor shaft is connected to the motor shaft connection member 260, the clamp 274 clamps the region of the cut slots 261 and thus the connection between the motor shaft and the motor shaft connection member 260 are not arbitrarily removed.

The motor installation plate 275 is coupled to the rear surface of the inscribed planetary gear reducer 100 to allow the installation of the motor. The motor installation plate 275 may be coupled to the bearing support member 272 by using a screw that is not illustrated.

The operation of the planetary gear reduction device 1 for super high speed reduction configured as above is described.

First, when a motor that is not illustrated operates and the motor shaft rotates, the primary reduction sun gear 210 may be rotated through the motor shaft connection member 260 and the sun gear connection device 250 forming the planetary gear reduction unit 200.

When the primary reduction sun gear 210 rotates, the primary reduction planetary gears 220 meshed thereto is self rotated and revolved by the primary reduction ring gear portion 230. Accordingly, the rotational speed of the motor may be primarily reduced by the above operation.

Meanwhile, when the rotational speed of the motor is primarily reduced by the planetary gear reduction unit 200, then the primary reduced speed is transferred directly to the input shaft module 120 of the inscribed planetary gear reducer 100.

As the primary reduced speed that is the primarily reduced rotational speed of the motor is transferred to the input shaft module 120 of the inscribed planetary gear reducer 100, the second input shaft module 122 of the input shaft module 120 is rotated and thus the first input shaft module 121 that forms one body by being shaft-coupled to the second input shaft module 122 may be rotated.

When the first input shaft module 121 rotates, the isotropic single-stage planetary gears 140 meshed with the input gear 121c of the first input shaft module 121 are rotated. When the isotropic single-stage planetary gears 140 rotate, the crank shafts 150 connected to the isotropic single-stage planetary gears 140 receive the rotational force and accordingly rotate and revolve.

In this state, the crank shafts 150 perform rotation and revolution and also perform secondary speed reduction according to a certain speed reduction ratio, that is, a mesh ratio of the input shaft module 120 and the isotropic single-stage planetary gears 140 meshed thereto. Also, the conjugate planetary gears 160 mounted on the eccentric cams 152 of the crank shafts 150 perform translational rotation.

The reduction motion of the crank shafts 150 may be transferred to the output shaft module 130 to output a reduced speed according to a desired speed reduction ratio, that is, the secondary reduced speed that is more reduced than the primary reduced speed at the side of the planetary gear reduction unit 200. Accordingly, although the equipment is compact, a super high speed reduction ratio may be provided.

According to the present embodiment having the above structure and operation, a super high speed reduction ratio may be provided due to an efficient structure and easy application to compact devices may be possible due to a lightweight and compact structure.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The present inventive concept may be used for industrial machinery, semiconductor or flat display manufacturing equipment, various kinds of logistics equipment, etc., as well as various machine tools requiring a rotational motion or a linear motion.

The invention claimed is:

1. A planetary gear reduction device for super high speed reduction, the planetary gear reduction device comprising:
a planetary gear reduction unit providing a primary reduced speed obtained by primarily reducing a rotational speed of a motor; and
an inscribed planetary gear reducer having an input shaft module and an output shaft module, wherein the input shaft module has an end portion connected to the planetary gear reduction unit and is formed by coupling at least two input shaft module parts as one input shaft module body, and wherein the output shaft module is adapted and configured for outputting a secondary reduced speed by further reducing the primary reduced speed by an interaction with the input shaft module;
wherein the at least two input shaft module parts of the input shaft module of the inscribed planetary gear reducer comprise:
a first input shaft module having one end portion disposed at a side of the output shaft module; and
a second input shaft module having one side coupled to the first input shaft module and another side connected to the planetary gear reduction unit;
wherein the first input shaft module comprises:
a first module head disposed at the side of the output shaft module and having an outer surface to which an input gear is connected; and
a first module shaft connected to the first module head,
wherein the second input shaft module comprises:
a second module hollow body having an empty hollow shape and into which the first module shaft is inserted; and
a second module flange formed on an end portion of the second module hollow body to be greater than a diameter of the second module hollow body.

2. The planetary gear reduction device of claim 1, wherein a key block for key coupling is provided on one of the first module shaft of the first input shaft module and the second module hollow body of the second input shaft module, and a key groove to which the key block is key-coupled is formed in another one of the first module shaft of the first input shaft module and the second module hollow body of the second input shaft module that does not have the key block,
wherein the key block is key-coupled to the key groove such that the first module shaft of the first input shaft module and the second module hollow body of the second input shaft module are key-coupled and the first module shaft of the first input shaft module and the second module hollow body of the second input shaft module are fixed by a bolt, forming the one input shaft module body.

3. The planetary gear reduction device of claim 1, wherein the planetary gear reduction unit comprises:
a primary reduction sun gear rotatably disposed at a center portion of the second module flange of the second input shaft module; and
a plurality of primary reduction planetary gears meshed with the primary reduction sun gear radially outside the primary reduction sun gear.

4. The planetary gear reduction device of claim 3, wherein the planetary gear reduction unit further comprises a ring gear plate coupled to a rear surface of the inscribed planetary gear reducer and having a center portion in which a primary reduction ring gear portion meshed with the plurality of primary reduction planetary gears is formed.

5. The planetary gear reduction device of claim 3, wherein a sun gear connection device greater than a diameter of the primary reduction sun gear is integrally provided at one side of the primary reduction sun gear, and
a motor shaft connection member, to which a motor shaft of the motor is connected, is coupled to the sun gear connection device.

6. The planetary gear reduction device of claim 5, wherein the planetary gear reduction unit further comprises:

a motor shaft connection bearing coupled to the outside of the motor shaft connection member and guiding rotation of the motor shaft connection member; and a bearing support member supporting the motor shaft connection bearing.

7. The planetary gear reduction device of claim 5, wherein the sun gear connection device and the motor shaft connection member are coupled to each other by an interference fit method, and a plurality of cut slots are formed in an end portion of the motor shaft connection member along a circumferential direction thereof.

8. The planetary gear reduction device of claim 7, wherein the planetary gear reduction unit further comprises:

a clamp selectively clamping a region of the plurality of cut slots of the motor shaft connection member; and a motor installation plate coupled to a rear surface of the inscribed planetary gear reducer for installation of the motor.

9. The planetary gear reduction device of claim 1, wherein the inscribed planetary gear reducer further comprises:

an internal gear integrated main body forming a place where the input shaft module and the output shaft module are mounted, wherein an internal gear is integrally formed on an inner wall; and an end cover coupled to one side of the internal gear integrated main body forming a place in which the planetary gear reduction unit is installed.

10. The planetary gear reduction device of claim 9, wherein the inscribed planetary gear reducer further comprises:

a plurality of isotropic single-stage planetary gears disposed at the side of the output shaft module in a circumferential direction of the first module head and meshed with the input gear of the first module head and engaged therewith; and a plurality of crank shafts each comprising a rotation shaft having one end portion connected to a respective said isotropic single-stage planetary gear and rotated by rotation of the isotropic single-stage planetary gear, and a plurality of eccentric cams, wherein each said eccentric cam is connected to a respective said rotation shaft with a phase difference of a predetermined interval.

11. The planetary gear reduction device of claim 10, wherein the inscribed planetary gear reducer further comprises a plurality of conjugate planetary gears having a center portion in which a module through hole through which the input shaft module passes is formed and an outer wall on which an outer gear meshed with the internal gear of the internal gear integrated main body, and connected to the eccentric cams of the crank shafts to perform translational rotation according to rotation of the crank shafts.

12. The planetary gear reduction device of claim 1, wherein the output shaft module comprises:

a flat output shaft having a center portion in which an input gear of the input shaft module is disposed; and a precession prevention plate coupled to the flat output shaft and preventing generation of a precessional motion.

13. The planetary gear reduction device of claim 12, wherein the output shaft module further comprises a vibration reduction pin coupled to the flat output shaft and the precession prevention plate and reducing output vibration.

14. The planetary gear reduction device of claim 1, wherein the output shaft module comprises:

a flat output shaft having a center portion in which an input gear of the input shaft module is disposed.

* * * * *